(12) United States Patent
Yasala et al.

(10) Patent No.: US 7,130,999 B2
(45) Date of Patent: Oct. 31, 2006

(54) USING AUTHENTICATION CERTIFICATES FOR AUTHORIZATION

(75) Inventors: Raju Yasala, Cupertino, CA (US);
Ernie F. Brickell, Portland, OR (US);
Donald J. Eckardt, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 10/107,388

(22) Filed: Mar. 27, 2002

(65) Prior Publication Data

US 2003/0188156 A1   Oct. 2, 2003

(51) Int. Cl.
*G06F 7/04* (2006.01)
*H04L 9/00* (2006.01)

(52) U.S. Cl. ............................... 713/157; 726/2; 726/4
(58) Field of Classification Search ................. 713/157, 713/158, 156; 726/2, 5, 4
See application file for complete search history.

(56) References Cited

U.S. PATENT DOCUMENTS 5,999,711 A * 12/1999 Misra et al. .................... 726/4
6,061,794 A * 5/2000 Angelo et al. ................. 726/3
6,233,341 B1 * 5/2001 Riggins ....................... 380/277

OTHER PUBLICATIONS

Oppliger, "Internet Security:Firewalls and Bey", Communications of the ACM, May 1997, vol. 40, No. 5, pp. 92-102.*
"Capabilities As A Public Key Infrastructure", 2 Pages, http://www.elib/capability/ode.

* cited by examiner

*Primary Examiner*—Matthew Smithers
(74) *Attorney, Agent, or Firm*—Libby H. Hope (57) ABSTRACT

In one embodiment of the invention is a method to use authentication certificates to authorize peers to particular applications. In addition to using authentication certificates to authenticate the identity and trustworthiness of a peer, authentication certificates are additionally used to authorize peers to particular applications. A list of certificates is maintained in a Peer Authorized Certificate Store (PACS), where the certificates may comprise any combination of root certificates, intermediate certificates, and peer certificates. When an authentication certificate is received from a peer, the peer is authenticated using the authentication certificate; and authorized by checking the authentication certificate against a Peer Authorized Certificate Store (PACS).

19 Claims, 6 Drawing Sheets

USING AUTHENTICATION CERTIFICATES FOR AUTHORIZATION

COPYRIGHT NOTICE

A portion of the disclosure of this patent document may contain material which is subject to copyright protection. To the extent that it does, the copyright owner has no objection to the facsimile reproduction by anyone of the patent document or the patent disclosure as it appears in the Patent and Trademard Office patent file or records, but otherwise reserves all copyright rights whatsoever. The following notice applies to the software and data as described bwlow and in the drawings hereto: Copyright © 2002, Intel Corporation, All Rights Reserved.

FIELD

Embodiments of the invention relate to the field of user authentication, and more particularly, to a method to use authentication certificates to authorize users to applications on a per application basis

BACKGROUND

With the widespread use of the Internet for transactions ranging from browsing websites to shopping to banking, the need to provide secure Internet service has become commonplace. One way to provide secure service is through the use of S-HTTP (Secure Hypertext Transfer Protocol). S-HTTP supports encryption/decryption and authentication of specific WWW (World Wide Web) documents sent over the Internet.

Alternatively, SSL (Secure Sockets Layer) is used to secure all traffic (i.e., the entire session as opposed to specific documents) for specific TCP/IP (Transmission Control Protocol/Internet Protocol) ports. SSL supports encryption and authentication. SSL provides a security handshake that is used to initiate the TCP/IP connection. This handshake results in the client and server agreeing on the level of security that will be used, and fulfills any authentication requirements for the connection.

Once the handshake is established, the SSL encrypts and decrypts the byte stream of the application protocol being used (such as HTTP, NNTP (Network News Transfer Protocol), or Telnet). Under the current state of the art, once the handshake is established, both client and server can freely exchange data, without regard to the particular application at hand.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In one aspect of embodiments of the invention, a method to authorize users to particular applications using authentication certificates is disclosed. An authentication certificate comprises a certificate chain that may include a root certificate, and any number of a peer certificates, and any number of intermediate certificates. An authentication certificate is used in a first level of security validation to authenticate the identity and trustworthiness of a peer to a validating peer in a network of computers. Authenticating the identity of a peer is accomplished by verifying each signature in the certificate chain, and authenticating the trustworthiness of a peer is accomplished by comparing the root certificate of the authentication certificate to a list of certificates in a trusted root certification authorities store (TRCAS) of the validating peer. If these checks are passed then the peer has been authenticated.

In a second level of security validation, a validating peer may use an authentication certificate to authorize a peer for a particular application. Authorization is accomplished by checking for the existence of an authentication certificate in a peer authorized certificates store (PACS). If any certificate in the chain of certificates in the authentication certificate exists in the PACS, then the peer is authorized to the particular application at hand. Otherwise, the peer is not authorized.

Embodiments of the present invention include various operations, which will be described below. The operations in embodiments of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

Embodiments of the present invention may be provided as a computer program product which may include a machine-readable medium having stored thereon instructions which may be used to program a computer (or other electronic devices) to perform a process according to embodiments of the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, embodiments of the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Embodiments of the invention are described with reference to the SSL security standard. However, these embodiments are intended to be for illustrative purposes only, and are not intended to limit the invention to the embodiments described. In fact, one of ordinary skill in the art should understand its general applicability, as will be apparent from the described embodiments. For example, embodiments of the invention may be implemented in a non-secure network.

SSL provides a security handshake that is used to initiate the TCP/IP connection between peers. During the handshake, the peers are authenticated to one another. Once authentication has been established, SSL encrypts and decrypts application layer data between the peers. In embodiments of the invention, authorization takes place during this handshake process.

Authentication

Authentication is a security function and process by which a system authenticates its peers that interact with the system. It is an assurance that can be implemented in addition to encryption, for example. A peer can be authenticated by using authentication information. This may include digital certificates, digital signatures, or both. A digital certificate (hereinafter referred to as an "authentication certificate") can be used to provide assurance that data downloaded from the Internet comes from a reputable source. Authentication certificates can be used to ensure the legitimate online transfer of confidential information, money, or other sensitive materials by means of public key cryptographic technology. An authentication certificate may comprise a certificate chain that may include a root certificate (where the peer is the root CA), and any number of peer certificates and intermediate certificates, all to be discussed.

Certificate Authorities

An authentication certificate is issued by a CA (certificate authority) and issued to a certificate owner. The authentication certificate provides information such as the time the certificate was issued, its validity period, the distinguished name of the issuer (the CA), and the distinguished name of the certificate owner. A CA may also be a certificate owner. If a CA issues a certificate to itself, i.e., if the issuer and the owner of a certificate are identical, then the CA is known as a root CA. A root CA may issue a certificate to an intermediate CA, and the intermediate CA may issue a certificate to another intermediate CA. This process may repeat itself until a certificate is ultimately issued to a peer. The certificate chain of an authentication certificate may comprise just a root certificate (where the root CA is the peer), or it may comprise the root certificate, peer certificate, and any number of intermediate certificates (including zero).

For example, if an authentication certificate is issued by a root CA to a peer, the certificate chain of the authentication certificate comprises the root certificate and the peer certificate. If the authentication certificate is issued by an intermediate CA to a peer, and the intermediate CA was issued the authentication certificate by a root CA, then the certificate chain of the authentication certificate comprises the root certificate, the intermediate certificate, and the peer certificate. If the authentication certificate is used by the root CA (it is not issued), then the authentication certificate comprises just the root certificate.

Certificate Revocation Lists

A certificate can be compromised before it expires. For example, it can fall into the wrong hands, or a CA may decide that the source it was issued to is no longer trusted. To revoke certificates that are known to be compromised before expiration, a CA posts revoked certificates to a Certificate Revocation List (CRL). A CRL is a list of certificates that have been revoked by a CA before they expire, and is available on the public domain. Since there may be several certificates in the certificate chain of an authentication certificate, a user checking a peer's authentication certificate checks all certificates in the certificate chain to ensure that the certificate is authentic. If any of the certificates in the chain are on a CRL, then the peer authentication certificate is not accepted.

Trusted Root Certification Authorities Store

Whereas a CRL stores a list of certificates that have been revoked, a TRCAS stores a list of root certificates to be trusted. A user may implement a Trusted Root Certification Authorities Store (TRCAS) to store those root CAs that the user wants to trust. If a user decides that it no longer wants to trust certificates from a particular root CA, the user can then remove the certificate of that root CA from the user's TRCAS. In embodiments of the invention, a TRCAS is used without the CRL. However, it is within the scope of embodiments of the invention to use a CRL and TRCAS in conjunction with one another.

As one of ordinary skill in the art would appreciate, where the authentication certificate has not been issued, the authentication certificate comprises the root certificate. In these cases, the TRCAS comprises the root certificate.

Establishing an SSL Handshake

Figure 1:
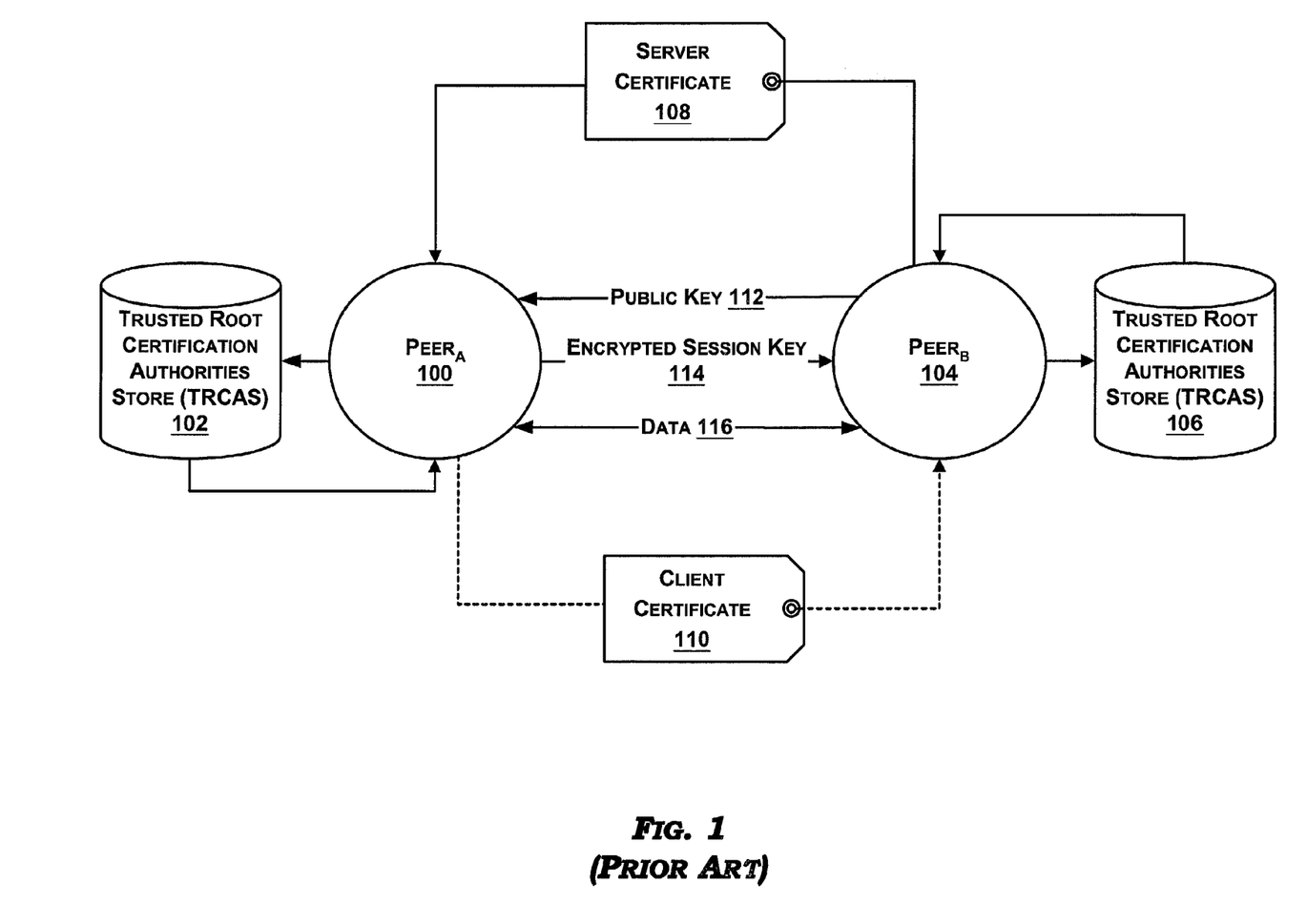
FIG. 1 is a block diagram illustrating a prior art system for using authentication certificates.

FIG. 1 is a block diagram illustrating how an SSL handshake is established between a first peer 100 Peer$_A$, and a second, peer 104 Peer$_B$. In embodiments of the invention, the first peer 100 may comprise a client, and the second peer 104 may comprise a server, for example. As one of ordinary skill in the art would understand, the interacting peers may be reversed, may both be clients, or may both be servers, as the situation dictates.

The first peer 100 requests a secure session with a second peer 104. The request for a secure session is also an implicit request for an authentication certificate. The second peer 104 returns a server certificate 108 (i.e., the server's authentication certificate), and may request a client certificate 110 (i.e., client's authentication certificate) from the first peer 100. The first peer 100 authenticates the server certificate 108 by verifying each signature in the certificate's chain, and by checking that the root certificate in the server's certificate chain is in a corresponding Trusted Root Certification Authorities Store (TRCAS) 102. If each certificate signature in the server's certificate chain is valid, and if the sewer's root certificate exists in the TRCAS 102, then the second peer 104 is authenticated. Otherwise, the first peer 100 closes the connection with the second peer 104.

Assuming the server certificate 108 is authentic, the first peer 100 then sends a client certificate 110 to the second peer 104 (if requested), and the second peer 104 authenticates the client certificate 110 by verifying each certificate signature in the certificate chain, and checking its root certificate against its TRCAS 106. If the client certificate 110 is authentic, then the two peers securely exchange a session key. The first peer 100 may then encrypt the session key with the second peer's public key 112, and send the encrypted session key 114 to the second peer 104. The second peer 104 decrypts the session key 114 using its private key. Application layer data 116 may then be securely exchanged between the first peer 100 and the second peer 104 using the session key to encrypt the data.

Figure 2:
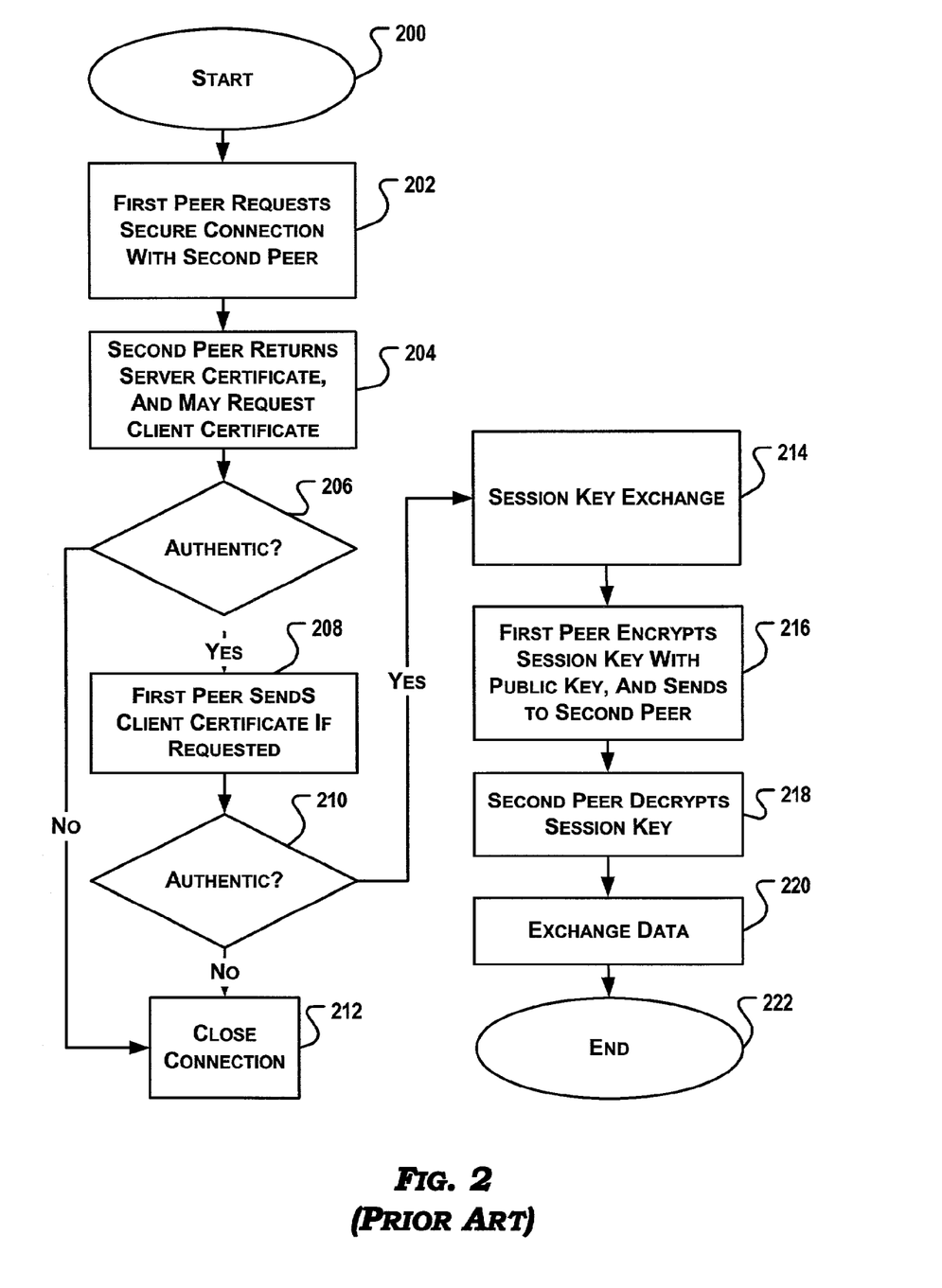
FIG. 2 is a flowchart illustrating a prior art method for FIG. 1.

FIG. 2 is a flowchart illustrating a method of FIG. 1. The method begins at block 200 and continues to block 202 where the first peer requests a secure session with a second peer. The second peer returns a server certificate, and may request a client certificate at block 204. At block 206, authenticity is determined by verifying each certificate signature in the certificate chain, and by checking for the existence of the root certificate in the TRCAS. If the server certificate is authentic, then the method continues, and the first peer sends a client certificate, if requested, at block 208. If the server certificate is not authenticated block 206, then the first peer closes its connection with the second peer at block 212.

The second peer checks the authenticity of the client certificate, if it was requested, by verifying each certificate signature in the certificate chain, and by checking for the existence of the root certificate in the TRCAS at block 210. If the client certificate was requested and it is not authentic, then the second peer may close its connection with the first peer at block 212. If the client certificate is authentic (or if it was not requested), then the first and second peers continue with session key exchange at block 214. The first peer may then encrypt the session key with the second peer's public key, and send the encrypted session key to the second peer at block 216. The second peer decrypts the session key using its private key at block 218. At block 220, application layer data may then be exchanged between the first peer and the second peer using the session key for encryption. The method ends at block 222.

Authorization

In embodiments of the invention, authentication certificates are additionally used to authorize users on a per application basis. Rather than trusting all users whose certificate is issued by a given CA, peers can customize the authorization of their peers on a per application basis. Whereas authentication is accomplished using a TRCAS, authorization is accomplished using a Peer Authorized Certificate Store (PACS).

Peer Authorized Certificate Store (PACS)

In embodiments of the invention, a PACS is a cost-efficient and convenient way for a user to control which peers it wants to allow authorization for a particular application. A PACS stores any combination of peer certificates, root certificates, and intermediate certificates, where each certificate comprises a list of the applications authorized for that certificate. A peer will be authorized for a particular application if any certificate in its certificate chain is in the PACS and is authorized for that application.

If a user wants to grant authorization to an individual peer for a specific application, the user would enter the certificate of that peer into the PACS and indicate that the specific application is authorized by that certificate. If a user wants to grant authorization for a specific application to every peer that has a certificate issued from a given CA, then the user would enter that CA certificate into the PACS, and indicate that the specific application is authorized by that certificate. So a peer certificate, intermediate CA certificate, or root CA certificate may exist in the PACS.

The user can indicate that multiple applications are authorized by a certificate. So a certificate, whether it is a peer certificate, an intermediate CA certificate, or a root CA certificate may indicate authorization in multiple applications.

Before a user enters a certificate into the PACS, the user should be certain that he is entering the correct certificate. The user could ask the peer that he wants to authorize to send him the certificate of the peer. Then the user could communicate with the peer through a method trusted by the user, such as a phone call, and confirm with the peer that he had the correct certificate. One method for doing this is for the user and the peer to confirm that the hash (or thumbprint) of the certificate is correct. Another method is for the user and the peer to confirm that the complete distinguished name of the certificate is correct. A complete distinguished name of a certificate comprises the distinguished name on the certificate, and the distinguished name of each CA in the certificate chain. Certificates may be identified using the complete distinguished name on an authentication certificate.

A user can easily revoke the authorization by using a PACS. For example, a user may decide that it no longer wants to trust a given peer certificate. In this case, the user would remove the peer certificate from the PACS. If there was a CA certificate (root or intermediate) in the PACS, and the user decided that he wanted to withdraw authorization to all of the certificates issued by that CA, then the user would remove the CA certificate from the PACS.

To determine if an authentication certificate indicated authorization to a particular application, the user would need to search the PACS to see if any certificate in the certificate chain was in the PACS, and if that certificate indicated authorization to the particular application. If the root certificate does not appear in the PACS, then an intermediate certificate is searched for, and if an intermediate certificate does not appear the PACS, then the peer's certificate is searched for. Of course, it is not necessary that the search be in this order. If any one or more of the certificates in the certificate chain is found in the PACS and the certificate indicates authorization for the particular application, then the peer is authorized. If none of these are found in the PACS, then the peer is not authorized for the particular application.

Establishing an SSL Handshake

Figure 3:
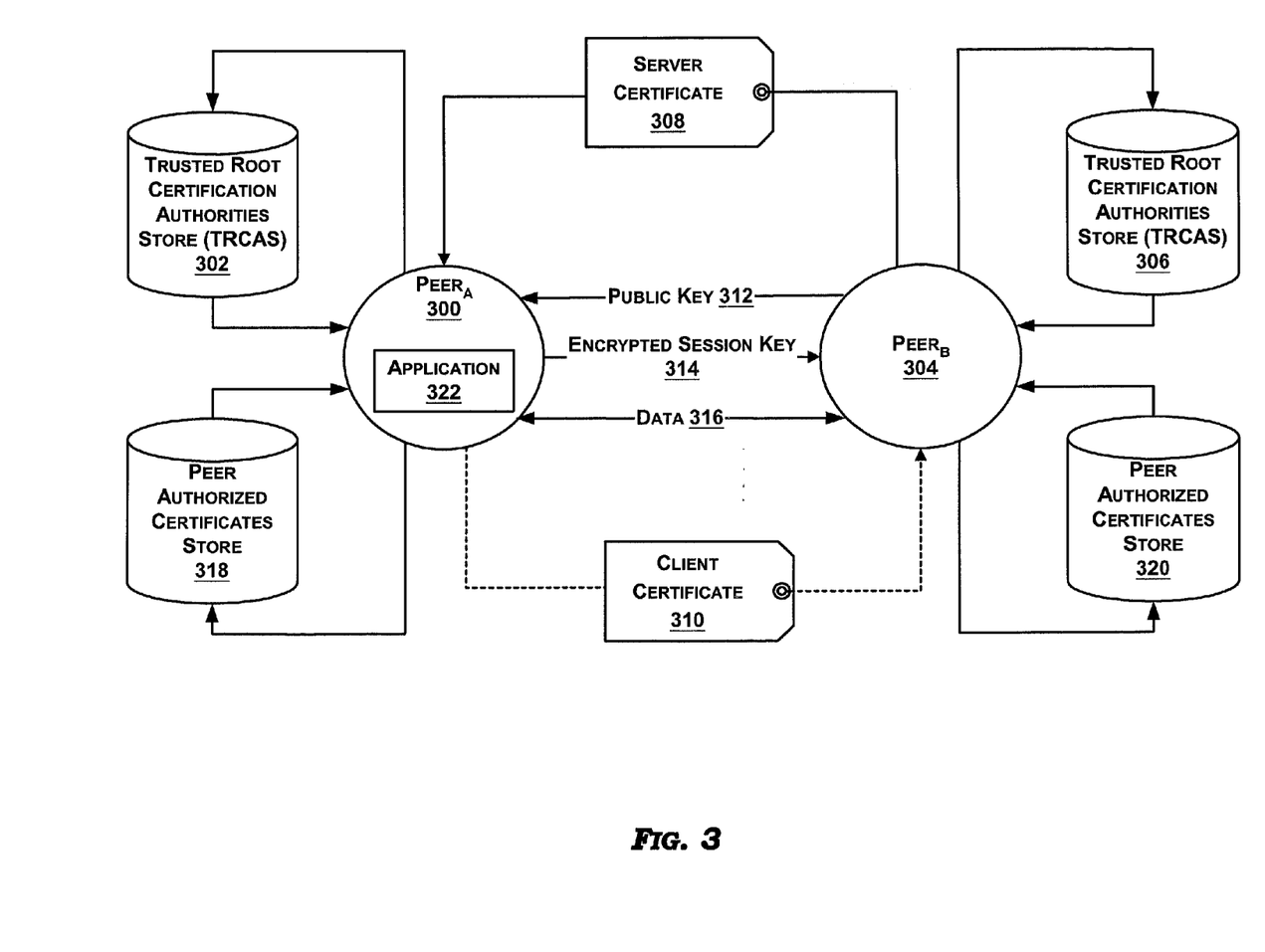
FIG. 3 is a block diagram illustrating a system for using authentication certificates to authenticate and authorize peers.

FIG. 3 is a block diagram illustrating how an SSL handshake is established between a first peer 300, Peer$_A$, and a second peer 304, Peer$_B$, in accordance with general embodiments of the invention. In embodiments of the invention, the first peer 300 may comprise a client, and the second peer 304 may comprise a server, for example. As one of ordinary skill in the art would understand, however, the interacting peers may be reversed, may both be clients, or may both be servers, as the situation dictates.

The first peer 300 requests a secure session (an implicit request to access an application) with a second peer 304. The request for a secure session is also an implicit request for an authentication certificate. The second peer 304 returns a server certificate 308, and may request a client certificate 310 from the first peer 300. The first peer 300 authenticates the server certificate by verifying each certificate signature in the certificate chain of the server certificate 308, and by checking the root certificate of the server certificate against a list of certificates in its TRCAS 302. If the root certificate in the certificate chain of the server certificate exists in the TRCAS 302, then the second peer 304 is authentic. Otherwise, the first peer 300 closes the connection with the second peer 304.

Additionally, the first peer 300 authorizes the second peer 304 to a particular application 322 by checking a corresponding Peer Authorized Certificates Store (PACS) 318. If any certificate in the server certificate chain of the second peer 304 exists in the PACS 318 and indicates authorization in the particular application, then the second peer 304 is authorized to the particular application 322 it is seeking to use.

Assuming the server certificate 308 is authentic, and that the second peer 304 has been authorized, the first peer 300 then sends a client certificate 310 to the second peer 304, and the second peer 304 checks the authenticity of the client certificate 310 by verifying each certificate signature in the certificate chain, and by checking the client certificate's root certificate against its TRCAS 306. If applicable, the second peer 304 also determines if the first peer is authorized to an application (not shown) by determining if any certificate in the certificate chain of the client certificate exists in its PACS 320, and by determining if any of those certificates indicate authorization for the particular application.

If the client certificate 310 is authentic, and if the first peer 300 has been authorized, then the first peer 300 and the second peer 304 complete the SSL key exchange. The first peer then encrypts the session key using the second peer's public key 312, and sends the encrypted session key 314 to the second peer. The second peer then decrypts the session key using its private key, and application layer data 316 may then be exchanged between the first peer 300 and the second peer 302. The order of this could be interchanged, so that the session key was created before one or both authorization checks were performed.

Figure 4:
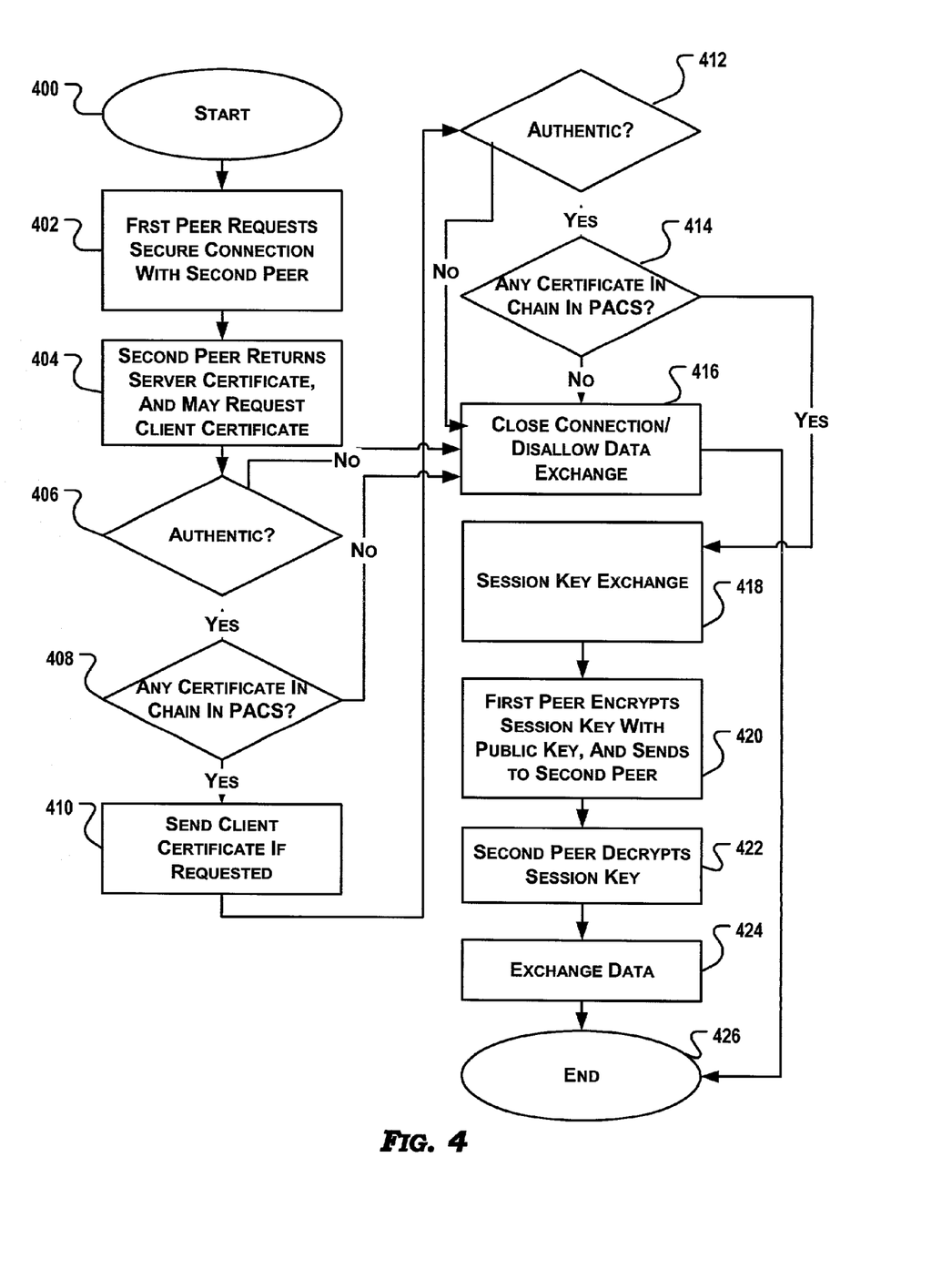
FIG. 4 is a flowchart illustrating a prior art method for FIG. 3.

FIG. 4 is a flowchart illustrating a method of FIG. 3. The method starts at block 400. The first peer requests a secure session with a second peer at block 402. The second peer returns a server certificate, and may request a client certificate at block 402. The first peer checks the authenticity of the server certificate by verifying each certificate signature in the certificate chain, and by determining if the root certificate of the server certificate is in the TRCAS at block 406. If the server certificate is valid, then at block 408, it is determined if any of the certificates in the certificate chain is in the PACS and indicates authorization for the particular application. If the server certificate is not authentic, or no certificate in the certificate chain both appears in the PACS and indicates authorization for the particular application, then the first peer may close the connection with the second peer or just disallow data exchange for the particular application at block 416.

If the server certificate is authenticated, and if any of the certificates in the certificate chain appears in the PACS and is authorized for the particular application, then at block 410, the first peer sends the client certificate, if requested. The first peer is tested for authenticity at block 412, and authorization at block 414. If the peer is not authenticated (i.e., one or more certificate signatures in the chain is not valid, or a root certificate does not exist in TRCAS), or if the first peer is not authorized for the particular application (i.e., no certificate in the certificate chain exists in PACS and indicates authorization for the particular application), then the second peer may close the connection with the first peer or just disallow data exchange for the particular application at block 416.

If the peer is authenticated and authorized at blocks 412 and 414, respectively, then the first peer and the second peer exchange session keys at block 418. At block 420, the first peer encrypts the session key using the second peer's public key, and sends the encrypted session key to the second peer. At block 422, the second peer decrypts the session key using its private key, and data may then be exchanged at block 424. The method ends at block 426.

Figure 5:
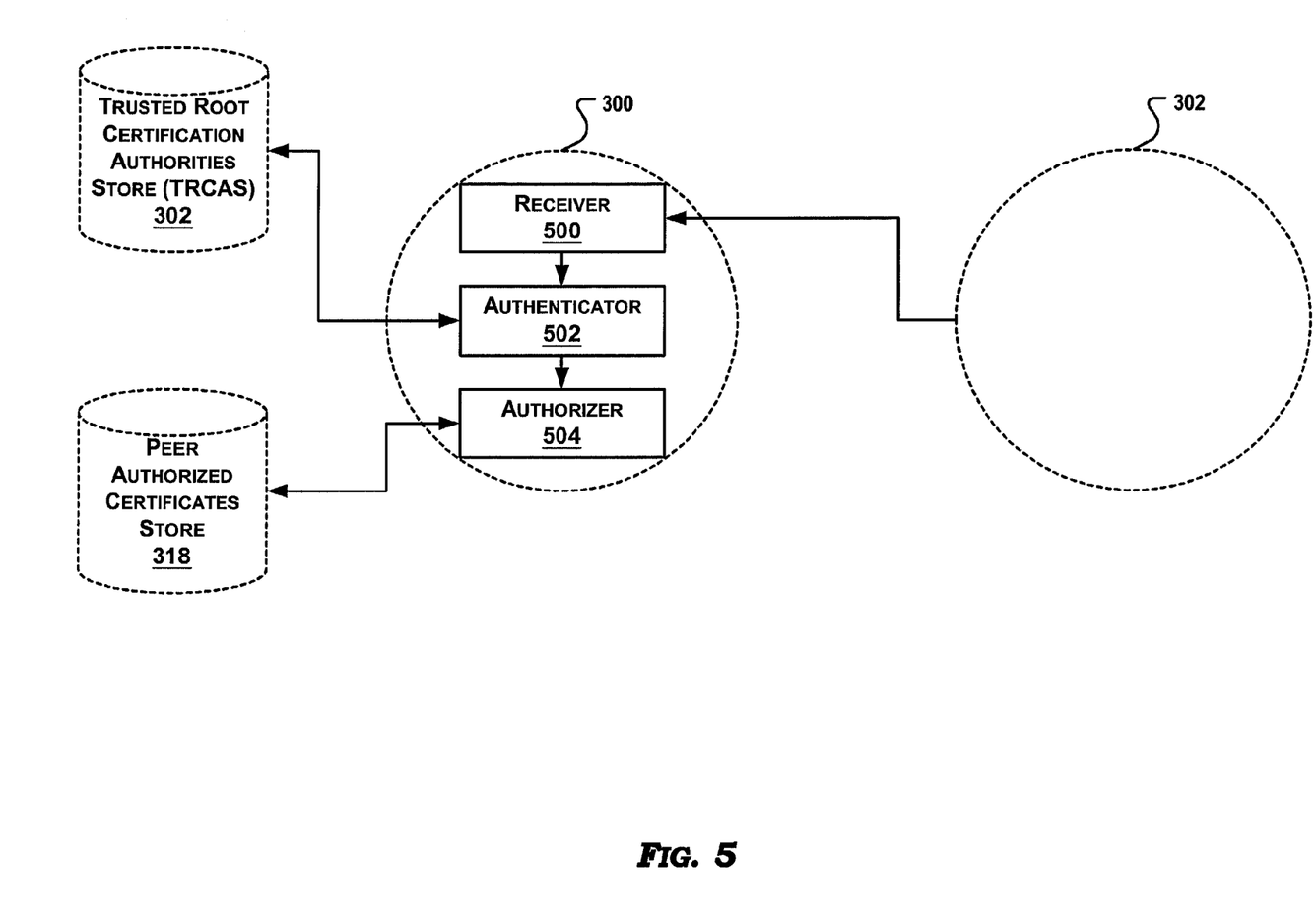
FIG. 5 is a block diagram illustrating sample componentry implemented in a peer for using authentication certificates to authenticate and authorize peers.

FIG. 5 is a block diagram illustrating sample componentry within a peer 300 to implement methods described above. A peer 300 may comprise a receiver 500, an authenticator 502, and an authorizer 504. The receiver 500 receives an authentication certificate from another peer 304. It is communicatively coupled to the authenticator 502, which verifies each certificate signature in the certificate chain, and checks the authentication certificate against a TRCAS 302. If each certificate signature in the chain is valid, and if a root certificate of the authentication certificate exists in the TRCAS 302, then the authenticator authenticates the peer 300. The authorizer 504 is communicatively coupled to the authenticator 502 to check the authentication certificate against a PACS 318 if the peer 300 has been authenticated. The authorizer 504 authorizes the peer to a particular application if any certificate in the certificate chain exists in the PACS.

Figure 6:
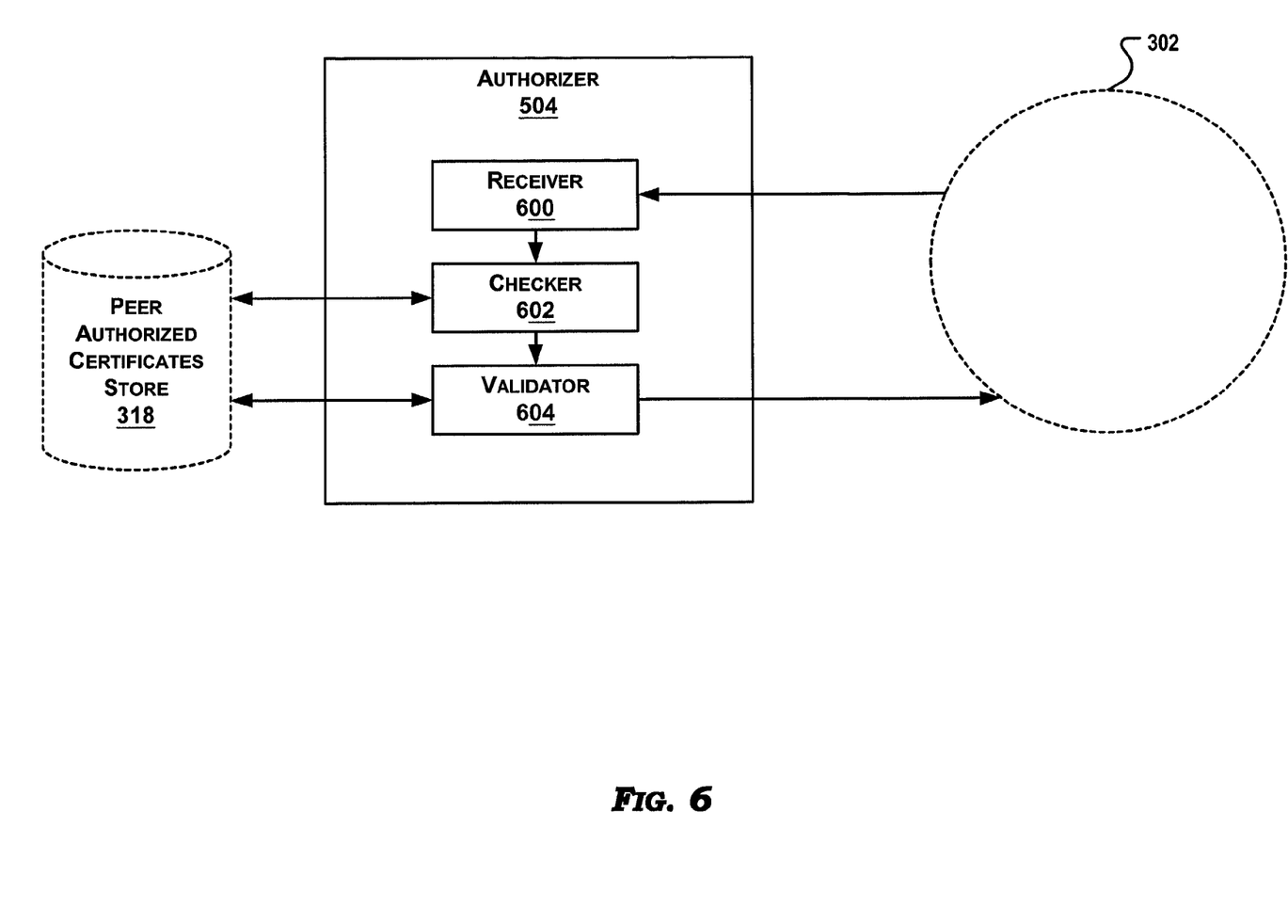
FIG. 6 is a block diagram illustrating sample componentry implemented in a validator of an authorizer in a peer for authorizing peers to a particular application.

FIG. 6 is a block diagram illustrating sample componentry within an authorizer 504 for authorizing a peer. An authorizer may comprise a receiver 600, a checker 602, and a validator 604. A receiver receives an authentication certificate on behalf of a peer 300 from another peer 304 (or from an authenticator). The checker 602 is communicatively coupled to the receiver 600 to check the received authentication certificate against a PACS. The validator 604 is coupled to the checker 602 so that the checker can convey to the validator 604 whether or not authorization has been established. If so, the validator 604 authorizes the peer 300.

While FIGS. 5 and 6 depict distinct components, one of ordinary skill in the art would understand that the components do not have to be implemented exactly as shown, and that there may, in fact, be more components, or less components for various implementations. Furthermore, any of the components, or their functions, may be implemented in software, hardware, or a combination of both.

Conclusion

Thus, in one aspect of embodiments of the invention, a method to use authentication certificates to authorize users to particular applications has been described. Authorization allows peers to decide which peers have data exchange privileges on a per application basis. The use of certificate authentication to achieve authorization can be achieved with only a minimal change to the SSL communication protocol. The one time addition of a certificate to allow authorization can be verified with a thumbprint or with the complete distinguished name.

In the foregoing specification, the invention has been described with reference to specific embodiments thereof. It will, however, be evident that various modifications and changes may be made thereto without departing from the broader spirit and scope of the appended claims. The specification and drawings are, accordingly, to be regarded in an illustrative rather than a restrictive sense.

What is claimed is:

1. A method comprising:
    receiving an authentication certificate from a peer requesting a secure connection to an application, the authentication certificate including a certificate chain having at least one certificate, and the authentication certificate comprising an SSL (Secure Sockets Layer) digital certificate; and using the authentication certificate to authorize the peer to the application by accessing a peer authorized certificates store (PACS) that stores authorized certificates.

2. The method of claim 1, wherein said accessing a PACS to determine authorization comprises determining if any certificate in the certificate chain exists in the PACS, and for a given certificate that exists in the PACS, determining if the given certificate is authorized to the application, and if at least one of the certificates in the certificate chain exists in the PACS and the PACS indicates authorization to the application, then authorizing the peer to the application.

3. A method comprising:

receiving an authentication certificate from a peer requesting a secure connection to an application, the authentication certificate including a certificate chain that includes at least a root certificate, and the authentication certificate comprasing an SSL (Secure Sockets Layer) digital certificate;

using the authentication certificate to authenticate the peer; and using the authentication certificate to authorize the peer to the application by accessing a peer authorized certificates store (PACS) that stores authorized certificates.

4. The method of claim 3, wherein said using the authentication certificate to authenticate the peer comprises verifying each certificate signature in the certificate chain and determining if the root certificate exists in a Trusted Root Certification Authorities Store (TRCAS), and if each signature is verified, and the root certificate exists in the TRCAS, then authenticating the peer to establish the secure connection to the application.

5. The method of claim 4, wherein said using the authentication certificate to authorize the peer comprises comparing the certificates in the certificate chain of the authentication certificate to the authorized certificates in the peer authorized certificates store (PACS), and if at least one of the certificates in the certificate chain exists in the PACS and the PACS indicates authorization to the application, then authorizing the peer to the application.

6. A tangible machine-readable medium having stored thereon data representing sequences of instructions, the sequences of instructions which, when executed by a processor, result in the processor to perform the following: determine if a peer is authentic by authenticating an authentication certificate sent by the peer, the authentication certificate including at least a root certificate in a certificate chain, and the authentication certificate comprising an SSL (Secure Sockets Layer) digital certificate; and determine if the peer is authorized to an application requested by the peer by using a peer authorized certificate store (PACS).

7. The tangible machine-readable medium of claim 6, the processor to additionally: authenticate the peer if each signature in the certificate chain is verified, and if the root certificate exists in the TRCAS; and authorize the peer to the application if any certificate in the certificate chain exists in the PACS and the PACS indicates authorization to the application.

8. The tangible machine-readable medium of claim 6, wherein the certificate chain comprises the root certificate and a peer certificate, and the peer is authorized if either one of the root certificate and the peer certificate exists in the PACS and is authorized to the particular application.

9. An apparatus comprising:

a receiver to receive on a first peer an authentication certificate from a second peer, the authentication certificate having a chain of certificates including at least a root certificate, and at least one intermediate certificate, and the authentication certificate associated with a request for a secure connection to an application;

a checker to determine:
if the root certificate exists in a peer authorized certification authorities store (PACS), and if the PACS indicates the root certificate is authorized to the application; and
if the root certificate does not exist in the PACS, then the checker to determine if any one of the intermediate certificates exists in the PACS and if the PACS indicates any one of the intermediate certificate is authorized to the application; and a validator to authorize the second peer to the application if at least one of the root certificate end one of the at least one intermediate certificates exists in the PACS, and is authorized to the application.

10. The apparatus of claim 9, wherein the chain of certificates additionally comprises at least one peer certificate, and the checker determines if any certificate in the chain of certificates exists in the PACS and if the PACS indicates authorization to the application by additionally determining if one of the at least one peer certificates exists in the PACS and indicates authorization to the application.

11. The apparatus of claim 10, wherein the checker determines if the peer certificate exists in the PACS if none of the intermediate certificates exist in the PACS.

12. A system comprising:

a receiver to receive from a peer an SSL (Secure Sockets Layer) digital certificate having a certificate chain including at least one certificate that is a root certificate;

an authenticator to determine if peer is authentic; and an authorizer to determine if the peer is authorized to a given application on the system by determining if any certificate in the certificate chain exists in a peer authorized certification authorities store (PACS) and the PACS indicates authorization to the application.

13. The system of claim 12, wherein the authenticator determines if the peer is authentic by:

verifying each certificate signature in the certificate chain; and determining if the root certificate exists in a trusted root certification authorities store (TRCAS).

14. An apparatus comprising: at least one processor; and a tangible machine-readable medium having instructions encoded thereon, which when executed by the processor, are capable of directing the processor to: determine if a peer is authentic by authenticating an SSL (Secure Sockets Layer) digital certificate sent by the peer, the SSL digital certificate including at least a root certificate in a certificate chain; and determine if the peer is authorized to an application requested by the peer by using a peer authorized certificate store (PACS).

15. The apparatus of claim 14, wherein the instructions are additionally capadle of directing the processor to authenticate the peer by verifying each signature in the certificate chain and finding the root certificate in a trusted root certification authorities store (TRCAS).

16. The apparatus of claim 14, wherein the instructions are additionally capable of directing the processor to authorize the peer to the reguested application by determining that at least one certificate in the certificate chain exists in a PACS.

17. A method comprising:
receiving on a first peer an authentication certificate from a second peer, the authentication certificate having a chain of certificates including a root certificate, and at least one intermediate certificate, and the authentication certificate associated with a request for a secure connection to an application;
termining if the root certificate exists in a peer authorized certification authorities store (PACS), and if the PACS indicates the root certfficate is authorized to the application;
if the root certificate does not exist in the PACS, then determining if one of the at least one intermediate certificates exists in the PACS and if the PACS indicates the one of the at least one intermediate certificates is authorized to the application; and
authorizing the second peer to the application if one of the root certificate and the at least one intermediate certificates exists in the PACS, and is authorized to the application.

18. The method of claim 17, wherein the chain of certificates additionally comprises at least one peer certificate, the method additionally comprising determining if one of the at least one peer certificates exists in the PACS and indicates authorization to the application.

19. The method of claim 18, wherein said determining if one of the at least one peer certificates exists in the PACS and indicates authorization to the application comprises determining if one of the at least one peer certificates exists in the PACS and indicates authorization to the application if one of the at least one intermediate certificates does not exist in the PACS.

\* \* \* \* \*

UNITED STATES PATENT AND TRADEMARK OFFICE
CERTIFICATE OF CORRECTION

PATENT NO. : 7,130,999 B2  Page 1 of 1
APPLICATION NO. : 10/107388
DATED : October 31, 2006
INVENTOR(S) : Yasala et al.

It is certified that error appears in the above-identified patent and that said Letters Patent is hereby corrected as shown below:

In column 9, at line 20, delete "comprasing", insert --comprising--.

In column 10, at line 19, delete "end", insert --and--.

In column 10, at line 30, delete "the", insert --one of the at least one--.

In column 10, at line 30, delete "certificate", insert --certificates--.

In column 10, at line 31, insert --at least one-- in front of "intermediate".

In column 10, at line 36, insert --the-- in front of "peer".

In column 10, at line 65, delete "reguested", insert --requested--.

In column 11, at line 8, delete "termining", insert --determining--.

Signed and Sealed this

Fourth Day of September, 2007

JON W. DUDAS
*Director of the United States Patent and Trademark Office*